US 12,286,929 B2

(12) United States Patent
Hachem et al.

(10) Patent No.: US 12,286,929 B2
(45) Date of Patent: Apr. 29, 2025

(54) METHOD FOR PRODUCING ELECTRICAL AND/OR MECHANICAL ENERGY FOR A CONSUMER SYSTEM AND ASSOCIATED PRODUCTION SYSTEM

(71) Applicant: TotalEnergies OneTech, Courbevoie (FR)

(72) Inventors: Joe Hachem, Versailles (FR); Michel Moliere, Belfort (FR); Dominique Hubert Jean Yves Marie Orhon, Pau (FR); Thierry Fernand Schuhler, Fontaine la Mallet (FR); Assaad Zoughaib, Rambouillet (FR)

(73) Assignee: TotalEnergies OneTech, Courbevoie (FR)

( * ) Notice: Subject to any disclaimer, the term of this patent is extended or adjusted under 35 U.S.C. 154(b) by 0 days.

(21) Appl. No.: 18/039,800

(22) PCT Filed: Dec. 3, 2021

(86) PCT No.: PCT/EP2021/084164
§ 371 (c)(1),
(2) Date: Jun. 1, 2023

(87) PCT Pub. No.: WO2022/117812
PCT Pub. Date: Jun. 9, 2022

(65) Prior Publication Data
US 2024/0003295 A1    Jan. 4, 2024

(30) Foreign Application Priority Data
Dec. 3, 2020  (FR) ...................................... 20 12632

(51) Int. Cl.
*F02C 7/057*    (2006.01)
*F02C 7/047*    (2006.01)
(Continued)

(52) U.S. Cl.
CPC .............. *F02C 7/057* (2013.01); *F02C 7/047* (2013.01); *F02C 7/08* (2013.01); *F02C 7/143* (2013.01)

(58) Field of Classification Search
CPC .......... F02C 7/143; F02C 3/30; F02C 7/1435; F02C 9/20; F02C 3/34; Y02E 20/16;
(Continued)

(56) References Cited

U.S. PATENT DOCUMENTS 6,119,445 A  *  9/2000  Bronicki ............... F01K 21/047
                                                       60/39.53
6,318,065 B1 * 11/2001  Pierson .................. F02C 7/143
                                                       60/39.83
(Continued)

FOREIGN PATENT DOCUMENTS

CN       115263565 A   * 11/2022
EP       2 733 318 A1    11/2013

OTHER PUBLICATIONS

Gas Turbines for the Petroleum, Chemical, and Gas Industry Services, API Standard 616 Sixth Edition, Sep. 2022.*
(Continued)

*Primary Examiner* — Craig Kim
(74) *Attorney, Agent, or Firm* — Troutman Pepper Locke LLP (57) ABSTRACT

Said method is implemented via a power generation unit comprising at least one combustion turbine configured to generate, at defined site conditions, without cooling or heating of the incoming air stream, a defined site electrical or/and mechanical power lower than a predefined maximum required electrical or/and mechanical power.

The method comprises the following steps cooling the incoming air stream when the power requested by the consumer system is greater than the defined site power of the power generation unit at the defined site conditions, and is (Continued)

lower than or equal to the predefined maximum required power; heating the incoming air flow when the power requested by the consumer system is lower than the defined site power of the power generation unit at the defined site conditions.

17 Claims, 7 Drawing Sheets

(51) Int. Cl.
*F02C 7/08* (2006.01)
*F02C 7/143* (2006.01)

(58) Field of Classification Search
CPC ....... Y02E 20/14; Y02E 60/16; F01K 21/047; F01K 23/10; F01D 17/16; F23R 3/26; F25B 27/02
See application file for complete search history.

(56) References Cited

U.S. PATENT DOCUMENTS

| | | | | |
|---|---|---|---|---|
| 6,332,321 | B1* | 12/2001 | Bronicki | F02C 3/305 |
| | | | | 60/728 |
| 7,065,953 | B1* | 6/2006 | Kopko | F02C 7/1435 |
| | | | | 60/726 |
| 7,644,573 | B2 | 1/2010 | Smith et al. | |
| 8,505,309 | B2 | 8/2013 | Gardiner et al. | |
| 9,863,315 | B2* | 1/2018 | Takeda | F01K 21/047 |
| 2009/0235634 | A1 | 9/2009 | Wang et al. | |
| 2009/0249794 | A1* | 10/2009 | Wilkes | H02P 9/04 |
| | | | | 60/773 |
| 2009/0252598 | A1* | 10/2009 | Snider | F02C 3/22 |
| | | | | 415/116 |
| 2010/0146981 | A1* | 6/2010 | Motakef | F02C 7/047 |
| | | | | 60/39.83 |
| 2010/0198419 | A1* | 8/2010 | Sonoda | F02C 9/28 |
| | | | | 60/773 |
| 2013/0125557 | A1* | 5/2013 | Scipio | F02C 9/48 |
| | | | | 60/773 |
| 2013/0199196 | A1 | 8/2013 | Chillar et al. | |
| 2014/0325990 | A1* | 11/2014 | Takeda | F02C 3/30 |
| | | | | 60/39.3 |
| 2020/0386155 | A1* | 12/2020 | Younes | F02C 3/30 |
| 2021/0131349 | A1* | 5/2021 | Kashler | F02C 6/16 |

OTHER PUBLICATIONS

Recommended Practice for Packaged Combustion Gas Turbines, API RP 11PGT, May 1, 1992.*
Liu, Z., et al. "Effect of Inlet Air Heating on Gas Turbine Efficiency under Partial Load" Energies 12, 3327, pp. 1-11 (2019).
Hachem, J., et al. "A Three Degrees-of-Freedom Power Modulation Sensitivity Analysis: Performance Improvement of Single-shaft Gas Turbines at Part-load" Proceedings of ECOS 2020—The International Conference On Efficiency, Cost, Optimization, Simulation and Environmental Impact of Energy Systems, pp. 1-12 (2020) cited in Specification.
IHI Corporation "Operating Gas Turbines at Maxium Efficiency" IHI Engineering Review vol. 50, No. 1, pp. 10-11 (2017).
Rapport De Recherche Préliminaire issued in French Patent Application No. 2012632 dated Jul. 2, 2021.
Rapport De Recherche Internationale issued in International Patent Application No. PCT/EP2021/084164 dated Jan. 18, 2022.

* cited by examiner

METHOD FOR PRODUCING ELECTRICAL AND/OR MECHANICAL ENERGY FOR A CONSUMER SYSTEM AND ASSOCIATED PRODUCTION SYSTEM

CROSS REFERENCE TO RELATED APPLICATIONS

The present application is a U.S. National Phase Application under 35 U.S.C. § 371 of International Patent Application No. PCT/EP2021/084164 filed Dec. 3, 2021, which claims priority of French Patent Application No. 20 12632 filed Dec. 3, 2020. The entire contents of which are hereby incorporated by reference.

FIELD OF THE INVENTION

The invention relates to a method for producing electrical and/or mechanical energy intended for a consumer system, including the following step:
generation of electrical and/or mechanical power via a power generation unit including at least one combustion turbine, the combustion turbine including a compressor, a combustion chamber, a dynamic expansion turbine, and a component rotated by the dynamic expansion turbine, the electrical and/or mechanical power generation including the compression of an air flow entering the compressor, the heating of the compressed air flow coming from the compressor, in the combustion chamber, so as to form a flow feeding the turbine, and the expansion, in the dynamic expansion turbine, of the flow feeding the turbine so as to rotate the dynamic expansion turbine.

BACKGROUND

A "consumer system" is e.g. a network, an installation and/or an equipment suitable for receiving electrical and/or mechanical energy and to consume it.

The power generated by the generation system is e.g. an electrical power. The consumer system is then advantageously an electrical grid, in particular an installation for the production of fluids, in particular an installation for the production of hydrocarbons at sea.

In a variant, the electrical grid is the electrical grid of an industrial installation, and/or of a group of individuals and/or companies.

Alternatively, the electrical grid is an interconnected national or transnational grid.

In a variant, the power generated is a mechanical power. The consumer system is a rotating system of an industrial installation, in particular a compressor or a pump, in particular in an installation for the production of fluids.

Combustion turbines are used to produce electrical and/or mechanical energy in many industrial applications, in particular for their good efficiency, their compactness, their reliability, their quality of being relatively easily operated and maintained, their operational flexibility and their competitive costs.

Firstly, such turbines are flexible through the nature of the fuel the turbines can burn, namely liquids (Diesel, fuel, ammonia, etc.) or gaseous (hydrogen, natural gas, biomass gas, etc.).

The turbines also have operational flexibility when the power required by the installation varies significantly over time.

Such is the case, in particular, in installations for the production of liquids, where peaks in electrical demand and load shedding by the electrical grid of the installation are likely to occur over time.

Furthermore, in such installations, the average electrical power required over time varies significantly between the beginning and the end of their operation.

Moreover, when the electrical grid is partly fed by renewable energy sources, combustion turbines are able to complete or to supplement the production of renewable energy, when environmental conditions make such production insufficient for the needs of the installation.

When designing and sizing an energy production system including combustion turbines, the maximum electrical power required by the electrical grid is usually predefined.

A power generation unit (PGU) including multiple combustion turbines is then provided, with a suitable sizing so that combustion turbines at their full load power are able to deliver the maximum electrical power required. The efficiency of gas turbines is maximum when used at full load.

However, during the life of the installation and also depending on the climatic conditions, the turbines operate rather at partial load, and rarely at full load.

Harmful consequences result therefrom, since the partial load operation of combustion turbines significantly degrades efficiency.

The fuel consumption required for power generation is thus increased and, consequently, the generation of greenhouse gases in the case of fossil fuels is increased.

To partially overcome such problem, it is known from the article "Proceedings of ECOS 2020, The 33rd International Conference on Efficiency, Cost Optimization Simulation and Environmental Impact of Energy Systems", Jun. 29-Jul. 3 2020 Osaka, Japan, how to increase the temperature of the inlet gases in the combustion turbine compressor at low load, in order to improve efficiency.

However, there is still a need to optimize the operation of the power generation unit over the entire range of electrical power it can supply.

SUMMARY

A goal of the invention is to provide, by limiting the investment, a method for producing energy, using a power generation unit including at least one combustion turbine, wherein the production of energy is carried out with lesser emissions of carbonic gases.

To this end, the subject matter of the invention is a method of the aforementioned type, characterized in that
the power generation unit is configured for generating, at the defined site conditions, without any cooling or heating of the incoming air flow, a defined site electrical and/or mechanical power less than a predefined maximum required electrical and/or mechanical power, to be supplied to the consumer system at the defined site conditions, by the power generation unit, the method including the following steps:
cooling of the incoming air flow when the power requested by the consumer system is greater than the defined site power of the power generation unit at the defined site conditions, and is less than or equal to the predefined maximum required power;
heating of the incoming air flow, when the power demanded by the consumer system is less than the defined site power of the power generation unit at the defined site conditions.

The method according to the invention can include one or multiple of the following features, taken individually or according to any technically possible combination:
- the method comprises a preliminary step of determining defined site conditions, and of defining and/or calculating the predefined maximum required electrical and/or mechanical power to be supplied to the consumer system at the defined site conditions;
- the defined site power of the power generation unit at the site defined conditions is comprised between 70% and 90%, in particular between 75% and 85%, of the maximum required power predefined by the consumer system at the defined site conditions;
- the cooling of the incoming air flow is implemented as soon as the power demanded by the consumer system is greater than the defined site power of the power generation unit at the defined site conditions, the heating of the incoming air flow being implemented as soon as the electrical power demanded by the consumer system is less than the defined site power of the power generation unit at the defined site conditions;
- the cooling of the incoming air flow includes adjusting the compressor inlet temperature to a minimum acceptable temperature of the incoming gas flow, the method including the adjustment of the power delivered to the consumer system by controlling the temperature of the flow feeding the turbine at the inlet of the dynamic expansion turbine;
- when the control of the temperature of the flow feeding the turbine at the inlet of the dynamic expansion turbine produces a power output less than the power required by the consumer system, the method includes the application of an increment in increasing the compressor inlet temperature above the minimum acceptable temperature of the inlet gas flow, then a new adjustment of the power delivered to the consumer system by controlling the temperature of the flow feeding the turbine at the inlet of the dynamic expansion turbine:
- heating the incoming air flow includes adjusting the power delivered to the power required by the consumer system by gradually increasing the compressor inlet temperature;
- the method includes, simultaneously with the gradual increase in the compressor inlet temperature, a decrease in the inlet temperature in the dynamic expansion turbine;
- the compressor has guide vanes variable in position defining an opening for the air flow entering the compressor, the heating of the incoming air flow including, simultaneously with the increase in the compressor inlet temperature, an increase in the opening defined by the guide vanes;
- the consumer system is an electrical grid, the power generated being an electrical power, the rotating member being a rotor of an electric generator of the combustion turbine or the consumer system is a system including a rotating component in an industrial installation, more particularly a compressor or a pump, the power generated being a mechanical power.

A further subject matter of the invention is a system for producing electrical and/or mechanical energy for a consumer system, including:
- a power generation unit including at least one combustion turbine, the combustion turbine including a compressor, a combustion chamber, a dynamic expansion turbine, and a component rotated by the dynamic expansion turbine, the power generation unit being suitable for generating electrical and/or mechanical power by compressing an air flow entering the compressor, by heating, in the combustion chamber, of the compressed air flow coming from the compressor, so as to form a flow feeding the turbine, and, by expansion, in the dynamic expansion turbine, of the flow feeding the turbine so as to rotate the dynamic expansion turbine,
characterized in that the power generation unit is configured for generating, under defined site conditions, without any cooling or heating of the incoming air flow, a defined site electrical and/or mechanical power less than a predefined maximum required electrical and/or mechanical power to be supplied to the consumer system at the defined site conditions, by the power generation unit,
the energy production system including a control system configured for controlling:
- a cooling of the incoming air flow when the power requested by the consumer system is greater than the defined site power of the power generation unit at the defined site conditions, and is less than or equal to the predefined maximum required power;
- a heating of the incoming air flow, when the power demanded by the consumer system is less than the defined site power of the power generation unit at the defined site conditions.

The system according to the invention can comprise one or multiple of the following features, taken individually or according to any technically possible combination
- the power generation unit includes multiple combustion turbines;
- the system includes a heat exchange system, mounted upstream of the compressor, for heating and/or cooling the incoming air flow;
- the heat exchange system is suitable for receiving a heating stream produced from a flow coming from the combustion turbine or having received calories from a flow coming from the combustion turbine to heat the incoming air flow;
- it has an absorption chiller, the heat exchange system being suitable for receiving a cooling stream from the absorption chiller;
- the cooling stream is produced in the absorption chiller from calories of a flow coming from the combustion turbine.

BRIEF DESCRIPTION OF THE DRAWINGS

The invention will be better understood upon reading the following description, given only as an example and making reference to the enclosed drawings, wherein.

DETAILED DESCRIPTION

Figure 1:
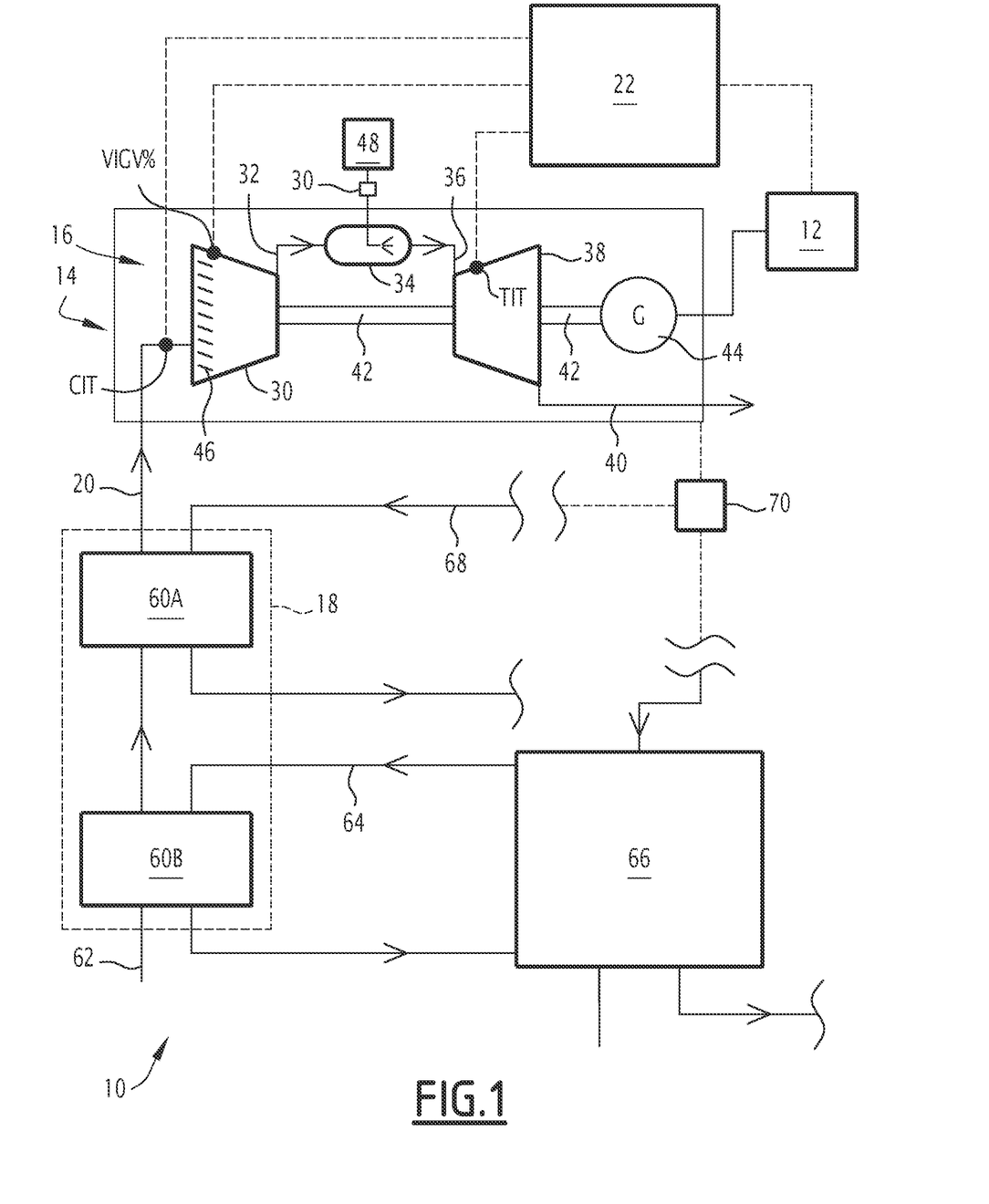
FIG. 1 is a schematic view of a first energy generation system according to the invention.
Figure 2:
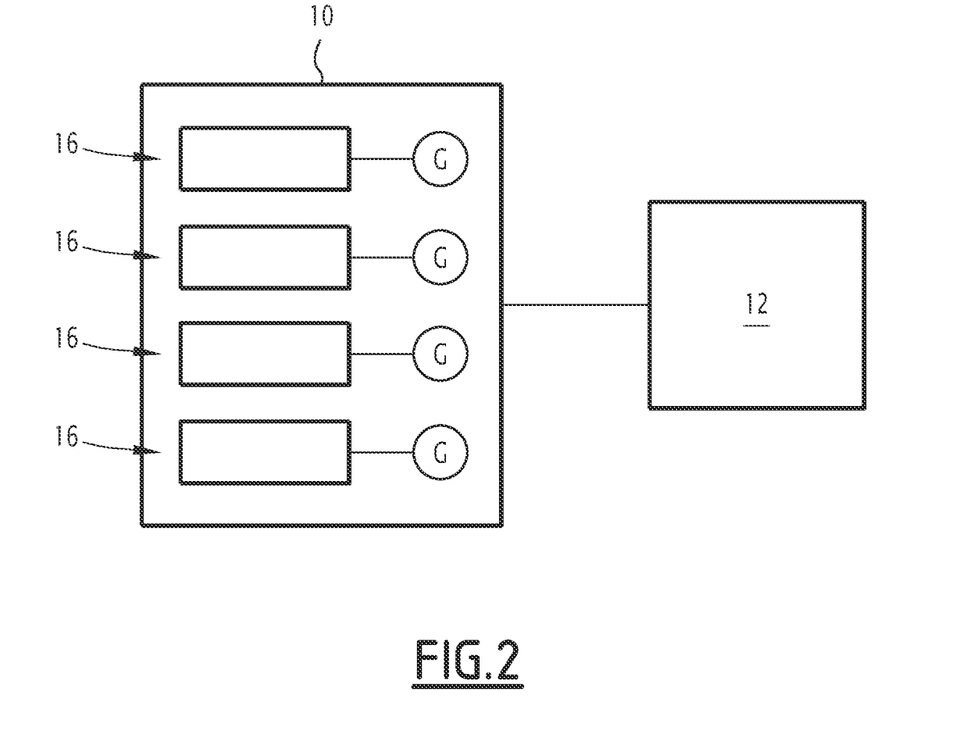
FIG. 2 is a diagram illustrating the implementation of the system shown in FIG. 1 with multiple combustion turbines.

A method of producing energy according to the invention is implemented in an energy production system 10 shown schematically in FIGS. 1 and 2.

In the above example, the energy produced by the production system 10 is electrical energy, intended for being supplied to a system consuming electrical energy, such as an electrical grid 12. In a variant, as will be described hereinbelow, the energy produced by the production system 10 is mechanical energy intended for a system consuming mechanical energy, in particular within an installation using fluids.

In said example, the method is intended for generating electrical energy for supplying an electrical grid 12 requiring electrical power for operating equipment.

The electrical grid 12 is e.g. an electrical supply grid for an installation using liquids, or more generally for an industrial installation. In a variant, the electrical grid is a network intended for supplying electricity to individuals and/or companies, or else to an interconnected national or transnational grid.

The electrical grid 12 requires at all times the supply of electrical power which is generated by the production system 10.

In particular, the electrical grid 12 is configured for requiring from the production system 10, at defined site conditions in terms of temperature, pressure and advantageously of humidity, a site predefined maximum required power Pmax, which is used for designing the electrical energy production system 10.

The site predefined maximum required power Pmax at the defined site conditions is advantageously calculated during the design of the production system 10, from the characteristics of the electrical grid 12 and the utilities connected thereto.

The defined site conditions (or "site rated conditions") are advantageously the conditions defined in the standards API 616 and API RP11 PGT. The conditions are determined beforehand during the design of the installation, depending on the weather and atmospheric conditions on the site.

The defined site conditions with regard to temperature are e.g. a maximum temperature encountered at the installation and/or an average temperature encountered at the installation, the temperatures being advantageously defined at the turbine inlet.

The defined site conditions with regard to pressure are e.g. a minimum and/or maximum atmospheric pressure encountered at the installation and/or a mean atmospheric pressure encountered at the installation, the pressures being advantageously defined at the turbine inlet and/or at the turbine outlet.

The defined site conditions with regard to humidity are e.g. a maximum humidity encountered at the installation, and/or an average humidity encountered at the installation, the humidities being advantageously defined at the turbine inlet.

The defined site conditions are e.g. the surrounding conditions of the sizing used in engineering.

As an example, a power generation unit installed on a floating support offshore of Nigeria, in the Gulf of Guinea e.g. can be sized taking into account the following site conditions:

sea level pressure varying between 0.9989 $bar_a$ and 1.017 $bar_a$;

ambient temperature varying between 18.9° C. and 33.7° C.;

relative humidity varying between 46.23% and 92.96%.

The site predefined maximum required power Pmax is then calculated under the following defined site conditions: pressure=0.9989 $bar_a$; temperature=30° C.; relative humidity=92.96%.

The defined site conditions are generally registered in the design files of the installation 10. They are sometimes communicated to government authorities in regulatory files attached to the production system 10.

The power demanded by the power grid 12 from the production system 10 over time is thus comprised between a power equal to zero, in the event of a total shutdown of the turbines and a taking over by emergency generators, a predefined standby power for the electrical grid 12, and the site predefined maximum required electrical power Pmax, at the defined site conditions mentioned above.

With reference to FIG. 1, the energy production system 10 includes a power generation unit 14, including at least one combustion turbine 16, the power generation unit 14 being able to produce, at the defined site conditions, a defined site power Pn less than the site predefined maximum required electrical power Pmax for the electrical grid 12.

The energy production system 10 further includes a heat exchange system 18, suitable for cooling or heating an air flow 20 intended for feeding the or each combustion turbine 16, and a control system 22, suitable for controlling the heat exchange system 18 and the or each gas turbine 16, in order to control the temperature of the gas flow circulating within each gas turbine 16.

With reference to FIGS. 1 and 2, the power generation unit 14 includes at least one combustion turbine 16, preferentially multiple parallel combustion turbines 16.

The number of combustion turbines 16 is generally comprised between 1 and 10, e.g. between 3 and 8. A larger number of combustion turbines 16 can be provided for installations requiring more electrical power.

Each combustion turbine 16 is suitable for generating, at the defined site conditions, a defined site power Pnt, resulting from its construction.

The defined site power is advantageously defined in the standards API 616 and API RP 11 PGT or is the "in-situ power" defined in the standard ISO 3977-2, under the site conditions.

According to the invention, the sum of the defined site powers Pnt which can be generated by each of the turbines 16 at the defined site conditions, which is the defined site power Pn of the power generation unit 14, is less than the maximum required power Pmax predefined at the defined site conditions.

E.g., the defined site power Pn which can be generated by the power generation unit 14 at the defined site conditions is comprised between 70% and 90%, advantageously between 75% and 85% of the maximum required power Pmax predefined for the electrical grid 12, at the defined site conditions.

Each combustion turbine 16 is a gas turbine. Each combustion turbine 16 includes a compressor 30, intended for compressing the incoming air flow 20, for generating a compressed air flow 32, a combustion chamber 34 suitable for mixing the compressed air flow 32 with a combustible, and the combustion of the combustible in the combustion chamber 34, for generating a flow feeding the turbine 36.

The combustion turbine 16 further includes a dynamic expansion turbine 38 suitable for receiving the flow feeding the turbine 36 and for expanding the flow dynamically, for generating an expanded flow 40.

The combustion turbine 16 further includes a shaft 42 rotated by the dynamic expansion turbine 38, and a generator 44 having a rotor rotated by the dynamic expansion turbine 38 via the shaft 42. In the example above, the compressor 30 is also mounted on the same shaft 42.

More particularly, the combustion turbine 16 includes a single shaft 42 having a constant speed of rotation.

Advantageously, in order to control the flow rate of the compressed air flow 32 supplied to the combustion chamber 34, the compressor 30 includes a plurality of guide vanes 46 for the air flow 20, defining between them a variable opening VIGV %. The variable opening VIGV % of the guide vanes 46 controls the flow-rate of the air flow 20 taken into the compressor 30.

The combustion chamber 34 is connected to a source 48 of combustible, via a control valve 50 for the injection flow-rate of the combustible. The quantity of combustible injected into the combustion chamber 34 is thereby adjustable by controlling the valve 50.

The combustible present in the source 48 and injected into the combustion chamber is preferentially natural gas.

The generator 44 includes a rotor rotated by the shaft 42, and a stator. It is suitable for generating electrical power which is transmitted to the electrical grid 12 by an electrical connection.

The electrical power generated by the generator 44 depends in particular on the quantity of incoming air flow 20 fed into the compressor 30, on the inlet temperature CIT of the air flow 20 at the compressor 30, on the quantity of combustible injected into the combustion chamber 34, which affects the turbine inlet temperature TIT of the flow feeding the turbine 36.

The heat exchange system 18 is suitable, when the power required by the electrical grid 12 is greater than the defined site power Pn at the defined site conditions, for cooling the air flow 20 in order to reduce the inlet temperature CIT at the compressor 30.

On the contrary, the heat exchange system 18 is suitable for heating the air flow 20, in the case where the power required by the electrical grid 12 is less than the defined site power Pn at the defined site conditions, for increasing the inlet temperature CIT at the compressor 30.

To this end, advantageously, the heat exchange system 18 includes at least one heat exchanger 60A, 60B, suitable for making possible a contactless heat exchange between an initial air flow 62 intended for forming the air flow 20, and respectively a cooling stream 64, linked to a cold source 66, and a heating stream 68, linked to a hot source 70.

In a variant (not represented), the heat exchange system 18 is suitable for mixing the initial air flow 62 with a hot fluid or with a cold fluid, in order to heat or cool the air flow 20 fed into the compressor 30.

In this purely illustrative example, the heat exchange system 18 includes two separate heat exchangers 60A, 60B mounted in series.

In a variant, the exchangers 60A, 60B are mounted in parallel or are replaced by a single heat exchanger putting in heat exchange relation the streams 64, 68 and the flow 62.

The cold source 66 is e.g. an absorption chiller suitable of generating, by absorption, the cooling stream 64 from a hot flow coming from the hot source 70. The absorption chiller is e.g. a water/LiBr chiller.

The hot source 70 is e.g. a source of a fluid heated by the expanded flow 40 coming from the dynamic expansion turbine 38. In one embodiment, the expanded flow 40 enters into a heat exchange relation with a stream intended for being heated within the hot source 70. In a variant, the expanded flow 40 is used directly for forming all or a part of the heating stream 68.

The control system 22 includes e.g. at least one calculator including a memory containing software modules, and a processor suitable for executing the software modules present in the memory.

The control system 22 is suitable for controlling the power generation unit 14 and the heat exchange system 18, so as to supply the electrical grid 12 with the electrical power required at any instant.

It is suitable for receiving, from the electrical grid 12, information on the electrical power required at each instant by the electrical grid 12.

The control system 22 is connected to sensors measuring the compressor inlet temperature CIT, the opening VIGV % of the blades 46 and the calculated turbine inlet temperature TIT.

It is further connected to a controlling system for the opening of the valves 46, to an adjusting system for the quantity of combustible added in the combustion chamber 34, and to a controlling system for the temperature of the streams 64, 68.

As indicated above, as soon as the electrical power demanded by the electrical grid 12 is greater than the defined site power Pn at the defined site conditions, the control system 22 is suitable for activating a cooling of the incoming air flow 20 with the help of the heat exchange system 18, in order to supply a cooled incoming air flow 20.

On the other hand, as soon as the electrical power demanded by the electrical grid 12 is less than the defined site power Pn at the defined site conditions, the control system 22 is suitable for activating a heating of the incoming air flow 20 with the help of the heat exchange system 18, in order to supply a heated incoming air flow 20.

Figure 3:
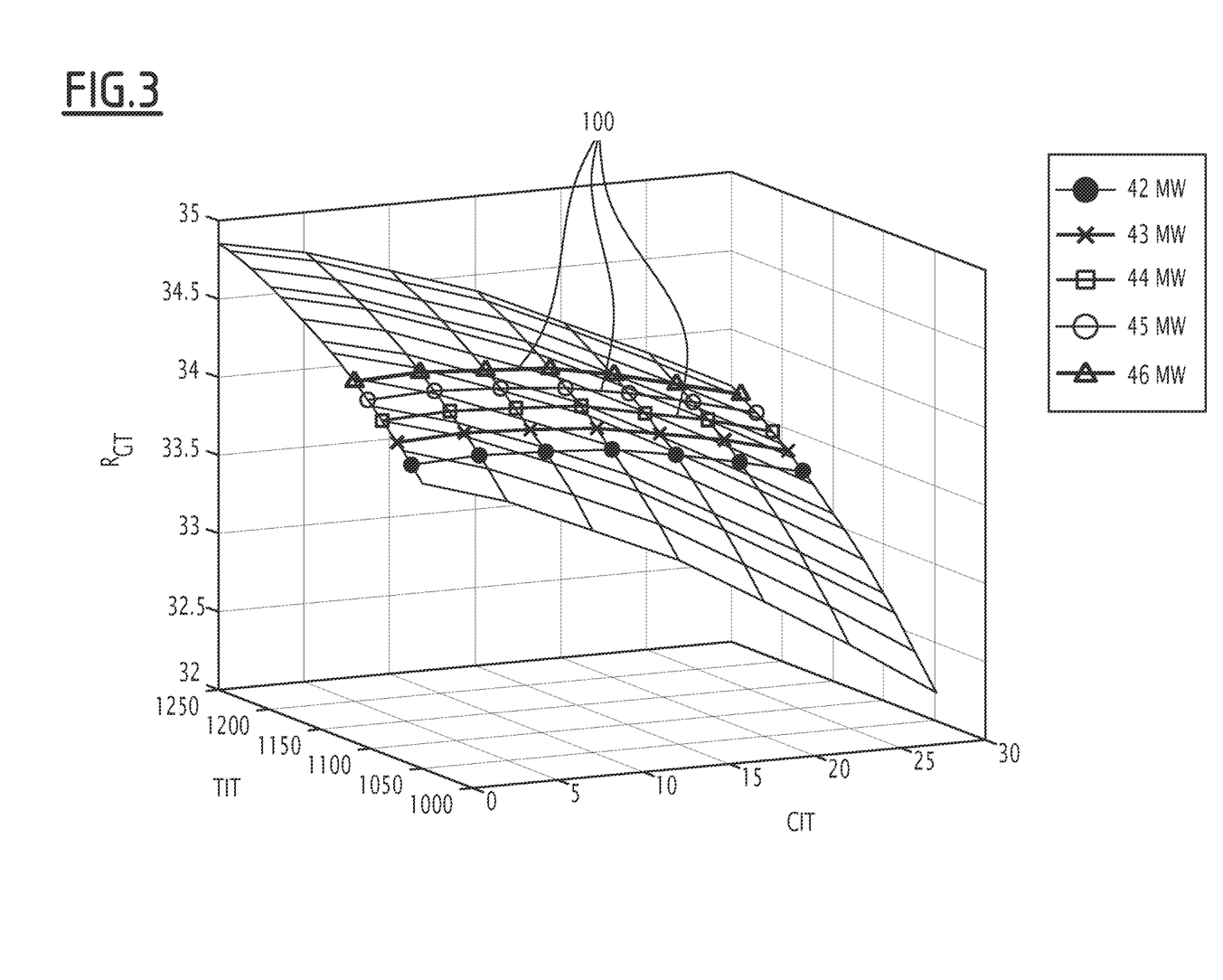
FIG. 3 is a view of a graph illustrating strategies for controlling the cooling of the air flow fed into the combustion turbine, in the implementation of the method according to the invention.

Advantageously, the control system 22 is suitable for controlling the compressor inlet temperature CIT and the turbine inlet temperature TIT, so as to maximize the efficiency of each combustion turbine 16, on the basis of delivered iso-power curves 100 illustrated in FIG. 3.

The efficiency $R_{GT}$ obtained on each of the delivered iso-power curves 100 is calculated as a function of the compressor inlet temperature CIT and the turbine inlet temperature TIT.

Preferentially, to maximize the efficiency of the combustion turbine 16, the minimum compressor inlet CIT temperature which can be reached, is chosen. This temperature is limited by the relative humidity of the air, to prevent any condensation in the compressor 30. The compressor inlet temperature CIT is e.g. comprised between 5° C. and 50° C.

At the same time, the turbine inlet temperature TIT is adjusted according to the power required by the electrical grid, maintaining the turbine inlet temperature TIT between a lower limit and an upper limit. The lower limit is the limit at which the stability of the combustion flame is obtained. The upper limit is a temperature which depends on the characteristics of the materials forming the turbine, and on the specification requirements of the machine.

The turbine inlet temperature TIT is e.g. comprised between 800° C. and 1700° C.

In the case where the lower limit of the turbine inlet temperature TIT is reached and the power supplied cannot be achieved, the compressor inlet temperature CIT is increased by one increment.

The cooling of the air flow 20 in the heat exchange system 18, and consequently of the compressor inlet temperature CIT, increases the quantity of material supplied to the dynamic expansion turbine 38.

The above allows the combustion turbine 16 to supply a power greater than the defined site power it supplies at the defined site conditions. The power supplied in the presence of the cooling of the air flow 20 is e.g. comprised between 101% and 120% of the defined site power Pn which it supplies at the defined site conditions. Furthermore, the efficiency of the combustion turbine 16 is increased when the power supplied is greater than 100% of the defined site power.

Thus, during the design of the production system 10, it is possible to undersize the power generation unit 14, so that the system supplies, at the defined site conditions, a defined site power Pn lower than the maximum required power Pmax predefined under the site conditions.

When implementing a power generation method using the production system 10 according to the invention, the missing power is compensated by the control system 22 which applies a cooling of the air flow 20 fed into the compressor 30 of the combustion turbine 16, as soon as the power required by the electrical grid 12 is greater than the defined site power Pn.

In the same way, as soon as the power required by the electrical grid 12 is lower than the defined site power Pn, the control system 22 increases the compressor inlet temperature CIT by heating the air flow 20, e.g. in a range from 15° C. to 50° C. The system advantageously reduces the turbine inlet temperature TIT, e.g. by 100° C., while simultaneously increasing the opening VIGV % of the vanes 46. This leads to operating with increased efficiency at low delivered powers, without the reduction of the maximum power of the combustion turbine 16, induced by the heating of the air, raising any problem, since the operation is under partial running.

Figure 4:
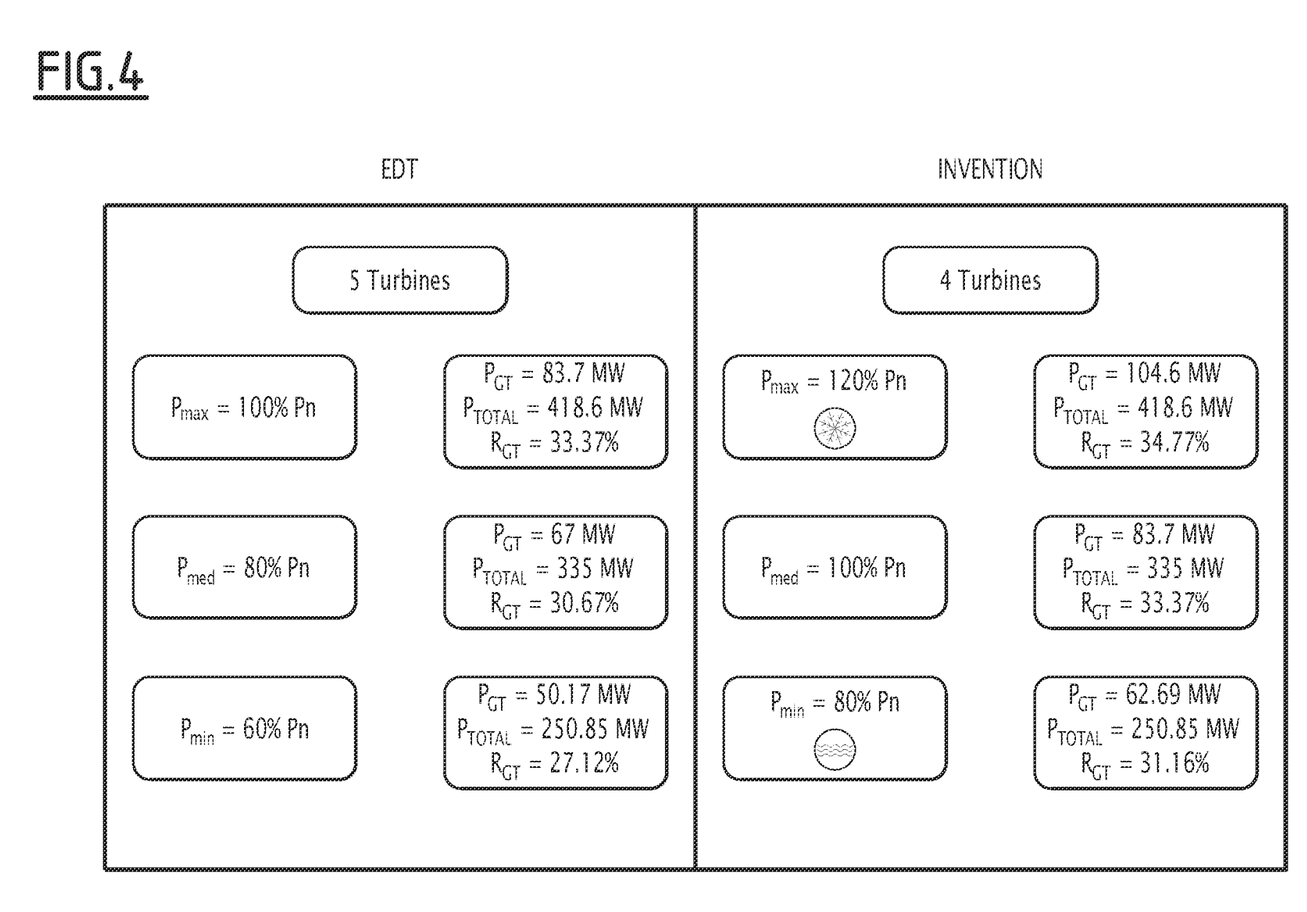
FIG. 4 is a comparison of the efficiencies obtained, between a prior art method and a method according to the invention.

Furthermore, as illustrated by the numerical example shown in FIG. 4, this limits the number of combustion turbines 16 needed (by passing here from 5 turbines to 4 turbines), which reduces investment and operating costs. The limited number of combustion turbines 16 is compensated by a wider operating range, which surprisingly produces better efficiency.

Overall, through the synergistic use of the cooling of the airflow 20 when the required power is above the defined site power Pn and of the heating of the air flow 20 when the required power is below the defined site power Pn, the combustion turbine 16 operates over the widest possible range of delivered power, starting from the predefined maximum required power Pmax, to a minimum power determined by the operating limits of the combustion chamber 34.

It is thus possible to adapt to various loads, despite an under-dimensioning of the power generation unit 14, which produces an overall reduction of the investments for building and operating the energy production system 10.

Furthermore, the energy production system 10 according to the invention is suitable for adapting and integrating itself, energetically, into an energy or heat cogeneration installation. More particularly, as shown in FIG. 1, the heat produced at the outlet of the gas turbine 16 is suitable for being used either directly or indirectly (in the case of steam heating under cogeneration of energy or of heating) for heating the air flow 20 at the inlet of the turbine, as well as for cooling same, using a cooler operating e.g. with the help of an absorption cycle.

The efficiency obtained by the electrical production system 10 according to the invention is improved over the entire range of power delivered. Moreover, the power delivered to the electrical grid 12 by the production system 10 being most of the time less than the predefined maximum required power Pmax, each combustion turbine 16 of the power generation unit 14 is likely to operate more often in the vicinity of their defined site power Pn, which improves efficiency.

The above is illustrated by FIG. 4, which shows that for a delivered power Pmed corresponding to 80% of the predefined maximum required power Pmax, the delivered power leads to partial load operation at 80% of the defined site power Pn for a prior art system with 5 turbines, with a degraded efficiency compared to operation at the defined site power Pn. On the other hand, for the production system 10 according to the invention, which includes only 4 turbines, the delivered power Pmed corresponds to approximately 100% of the defined site power Pn for the production system 10, and the increase in efficiency is 3%.

Moreover, an increase in efficiency is also observed when the power generation unit 14 delivers a power output Pmax above the defined site power Pn, by cooling the incoming air flow 20, or a power output Plow plus below its defined site power Pn, by heating the incoming air flow 20.

The values of the power $P_{GT}$ delivered by each combustion turbine 16, of the total power $P_{TOTAL}$ corresponding to the product of the power $P_{GT}$ multiplied by the number of turbines installed, and of the efficiency $R_{GT}$ of the combustion turbine 16, are given in FIG. 4 for each operating point.

There is thus a synergy of operation by using both the cooling and the heating of the air flow 20 for obtaining an improved efficiency of the installation, and better operability, while reducing the necessary investment.

Figure 5:
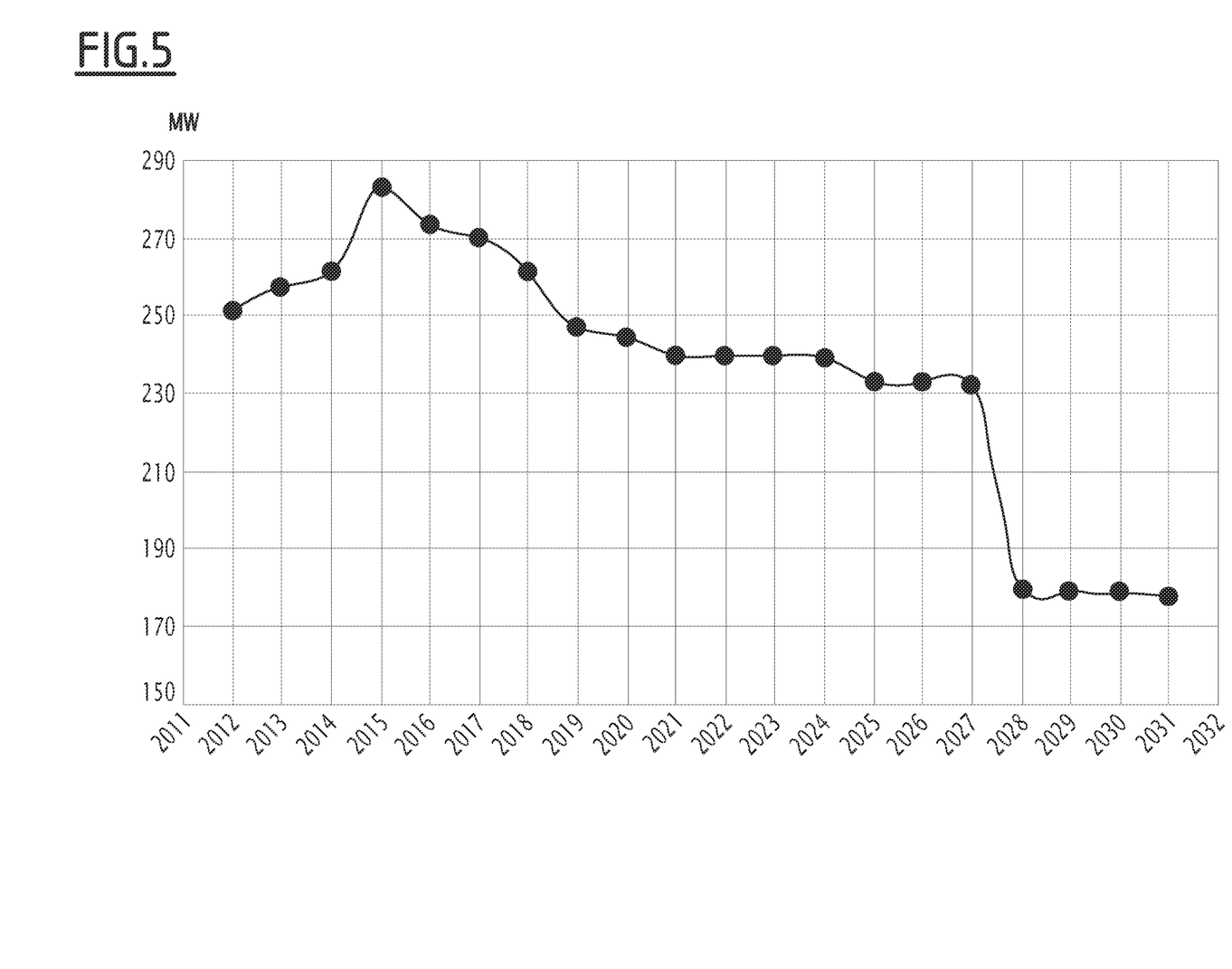
FIG. 5 is a view of a graph illustrating an example of a demand of electrical power required by an electrical grid over time.
Figure 6:
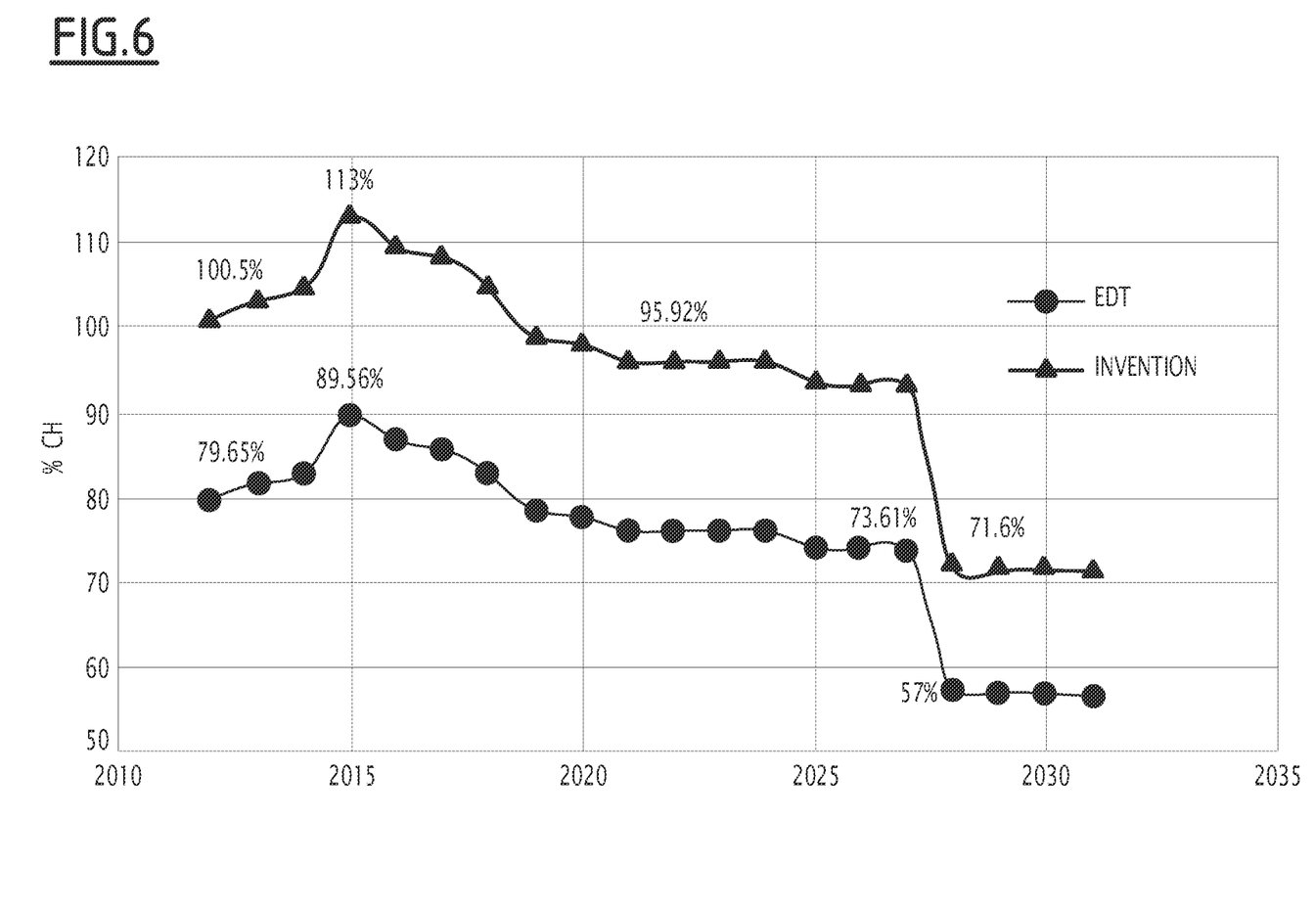
FIG. 6 is a view illustrating the percentage of load developed by the power generation unit of an energy production system according to the prior the art and of an energy generation system according to the invention with regard to the defined site electrical power as a function of time, so to meet the demand of electrical power shown in FIG. 5.
Figure 7:
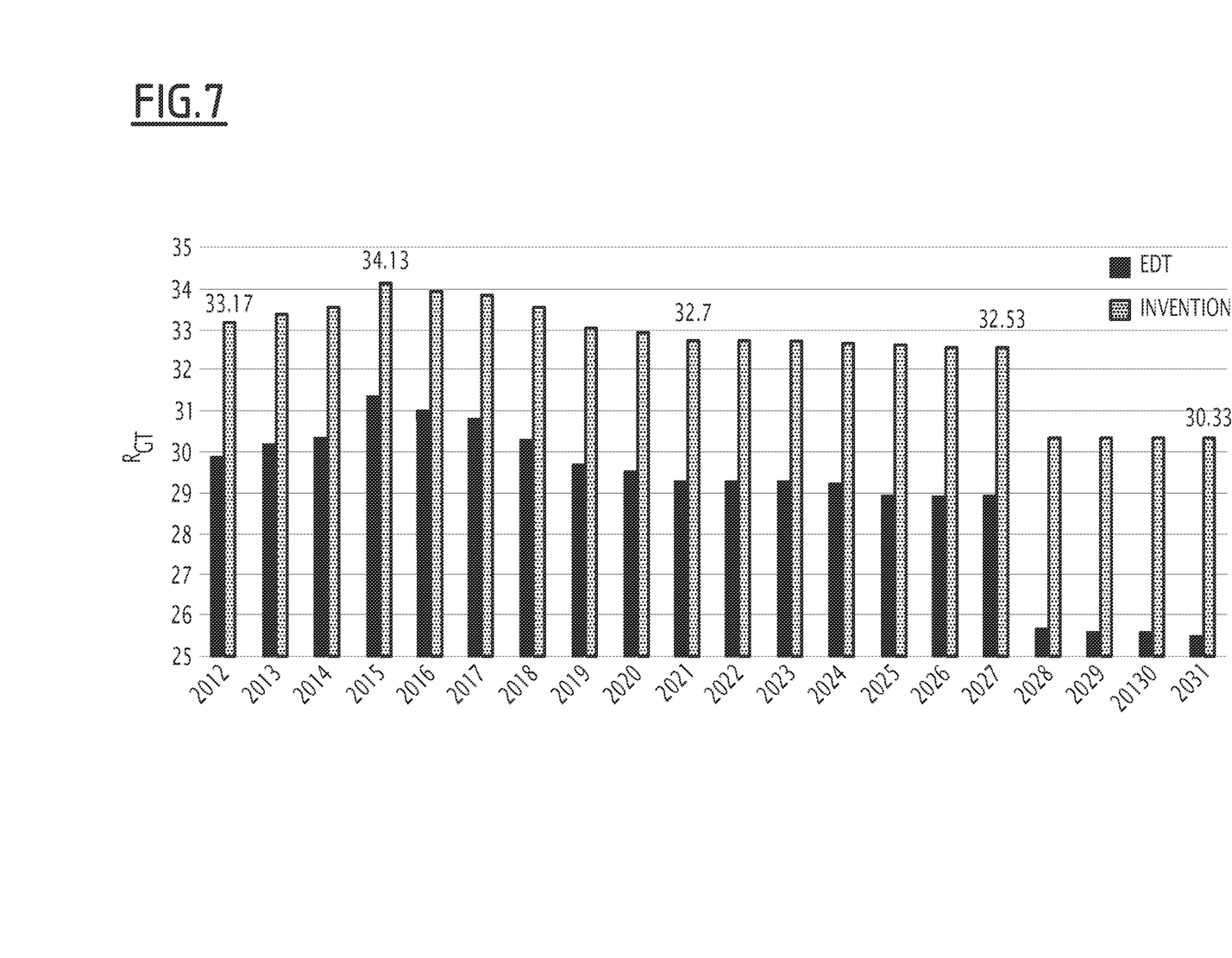
FIG. 7 illustrates the efficiency over time of a prior art energy production system, compared with an energy generation system according to the invention, in response to the demand for electrical power illustrated in FIG. 5.

The above is illustrated by the numerical simulation of an implementation of the energy production method shown in FIGS. 5 to 7.

FIG. 5 illustrates the average demand of electrical power of the electrical grid 12 over time, for an offshore installation using fluids. In said example, the defined site conditions of the plant include an ambient temperature of 30° C., a relative humidity of 60%, and a standard atmospheric pressure of 760 millimeters of mercury, i.e. 101325 Pa.

The power generation unit 14 includes three combustion turbines 16 operating simultaneously, and one on standby. The demand of electricity is simulated over twenty years.

As illustrated in FIG. 5, the maximum demand of electricity is 285 MW at the defined site conditions, as predefined above. The minimum demand of electricity is 177 MW, with an average demand of electricity equal to 236 MW.

The predefined maximum electrical power Pmax at the defined site conditions is predefined as being equal to 315 MW. The prior art electrical energy generation system is designed to provide a defined site power Pn equal to Pmax at the defined site conditions.

In the above example, the prior art electrical energy generation system includes three GT11N2 combustion turbines marketed by the company GE, each having a defined site power Pn equal to 105 MW at 30° C.

On the other hand, the combustion turbines 16 of the production system 10 according to the invention are smaller in size than those of the system of the prior art. They produce a defined site power Pn at the defined site conditions less than the maximum power Pmax, herein substantially equal to 79% of the maximum power Pmax.

In the above example, the production system 10 according to the invention includes three combustion turbines Frame 7F.03 marketed by the company GE, each having a defined site power Pn equal to 83 MW at 30° C.

For the implementation of the method using the production system 10 according to the invention, as soon as the percentage of load required (denoted "% CH" in FIG. 6), corresponding to the ratio of the required power to the defined site power Pn, is greater than 100%, a cooling of the incoming air flow 20 is generated by the heat exchange system 18, and as soon as the required percentage of load is less than 100%, a heating of the temperature of the incoming air flow 20 is performed.

FIG. 6 illustrates the percentage load of each combustion turbine 16 for the prior art system (curve EDT) and for the production system 10 according to the invention (curve INVENTION).

During the first years of operation (from about 2013 to 2019), the power required by the electrical grid 12 is greater than the defined site power Pn produced by the power generation unit 14 of the production system 10 according to the invention.

The production system 10 according to the invention operates with a cooling of the incoming air flow 20, which improves the efficiency.

The required power is then less than the defined site power, and decreases substantially over time, leading to load percentages significantly lower than 100%. The production system 10 according to the invention then operates with a heating of the incoming air flow 20.

As illustrated in FIG. 7, whatever the percentage of load required, the efficiency of the power generation unit 14 according to the invention is much greater than the efficiency of the prior art.

The absolute increases in efficiency are in the order of 0.4% to 1.1%, i.e. between 1% and 3.6% in relative terms, which is considerable given the electrical power consumed over time.

Table 1 below illustrates the gains produced by an energy production system 10 according to the invention, using a combustible consisting of natural gas having a low calorific value of 50.048 MJ/kg.

As shown in the table, the amount of combustible saved is on the order of 1.112 MT, which prevents the production of 3.087 MT of carbon dioxide. Such result is also obtained, with a lesser investment, since the combustion turbines 16 used in the production system 10 according to the invention are of smaller size.

TABLE 1

| | |
|---|---|
| Average demand of electrical power of the grid 12 | 235 MW |
| Total electrical power generated | 4716 MW |
| Combustible saved by the production system 10 according to the invention compared to the prior art system. | 1.112 MT |
| Carbon dioxide not emitted by the production system 10 according to the invention compared to the prior art system | 3.087 Mt |

In a variant (not represented) mentioned above, the production system 10 generates mechanical energy intended for a system consuming mechanical energy, more particularly within a fluid exploitation installation. The consumer system is then a system including a component rotating in an industrial installation, more particularly a compressor or a pump.

Like mentioned above, the power generation unit 14 is a mechanical power generation unit configured for generating, at the defined site conditions, without any cooling or heating of the incoming air flow 20, a defined site mechanical power lower than the predefined maximum required mechanical power to be supplied to the mechanical energy consuming system at the defined site conditions, by the power generating unit 14.

A cooling or heating of the incoming air flow 20 is implemented when the power requested by the consumer system is different than the defined site power of the power generation unit 14.

The invention claimed is:

1. A method to produce electrical and/or mechanical energy for a consumer system, including:
   generating electrical and/or mechanical power via a power generator including at least one combustion turbine, the at least one combustion turbine including a compressor, a combustion chamber, a dynamic expansion turbine, and a component rotated by the dynamic expansion turbine, generating the electrical and/or mechanical power including compressing an incoming air flow entering the compressor to produce a compressed air flow, heating the compressed air flow coming from the compressor in the combustion chamber, to form a flow feeding the turbine, and expanding, in the dynamic expansion turbine, the flow feeding the turbine to rotate the dynamic expansion turbine,
   the power generator being configured to generate, under predetermined defined site conditions, wherein said predetermined defined site conditions are site rated conditions determined during design of the power generator and determined prior to installation of the power generator, without any cooling or heating of the incoming air flow, a defined site electrical and/or mechanical power less than a predefined maximum required electrical and/or mechanical power to be supplied to the consumer system at the predetermined defined site conditions, by the power generator,
   cooling of the incoming air flow when a power requested by the consumer system is greater than the defined site electrical and/or mechanical power of the power generator at the predetermined defined site conditions, based on a comparison of the power requested by the consumer system and a predefined site power, and is lower than or equal to the predefined maximum required electrical and/or mechanical power; and
   heating the incoming air flow when the power requested by the consumer system is lower than the defined site electrical and/or mechanical power of the power generator at the predetermined defined site conditions, based on a comparison of the power requested by the consumer system and the predefined site power.

2. The method according to claim 1, wherein the defined site electrical and/or mechanical power of the power generator at the predetermined defined site conditions is comprised between 70% and 90% of the maximum required electrical and/or mechanical power predefined by the consumer system at the predetermined defined site conditions.

3. The method according to claim 1, wherein cooling the incoming air flow is implemented as soon as the power requested by the consumer system is greater than the defined site electrical and/or mechanical power of the power generator at the predetermined defined site conditions, the heating of the incoming air flow being implemented as soon as the electrical power requested by the consumer system is less than the defined site electrical and/or mechanical power of the power generator at the predetermined defined site conditions.

4. The method according to claim 1, wherein cooling the incoming air flow includes adjusting the compressor inlet temperature to a minimum acceptable temperature of the inlet gas flow, the method including adjusting a power delivered to the consumer system by controlling the temperature of the flow feeding the turbine at the inlet of the dynamic expansion turbine.

5. The method according to claim 4, wherein, when controlling the temperature of the flow feeding the turbine at the inlet of the dynamic expansion turbine produces a power output less than the power required by the consumer system, the method includes applying an increment of increase of the compressor inlet temperature above the minimum acceptable temperature of the inlet gas flow, then adjusting again the power delivered to the consumer system by controlling the temperature of the flow feeding the turbine at the inlet of the dynamic expansion turbine.

6. The method according to claim 1, wherein the heating of the incoming air flow includes adjusting the delivered power to a power required by the consumer system by gradually increasing the compressor inlet temperature.

7. The method according to claim 6, including, simultaneously with gradually increasing the compressor inlet temperature, decreasing the inlet temperature at the dynamic expansion turbine.

8. The method according to claim 6, wherein the compressor has guide vanes variable in position defining an opening for the incoming air flow into the compressor, heating the incoming air flow including, simultaneously with increasing the compressor inlet temperature, increasing the opening defined by the guide vanes.

9. The method according to claim 1, wherein the consumer system is an electrical grid, the power generated being an electrical power, the rotating component being a rotor of an electric generator of the combustion turbine or wherein the consumer system is a compressor or a pump, the power generated being a mechanical power.

10. The method of claim 1, wherein the predetermined defined site conditions comprise at least one of:
- a maximum temperature encountered at the installation and/or an average temperature encountered at the installation, the temperatures being defined at a turbine inlet;
- a minimum atmospheric pressure encountered at the installation and/or a maximum atmospheric pressure encountered at the installation and/or a mean atmospheric pressure encountered at the installation, the pressures being defined at the turbine inlet and/or at a turbine outlet;
- a maximum humidity encountered at the installation and/or an average humidity encountered at the installation, the humidities being defined at the turbine inlet.

11. A system to produce electrical and/or mechanical power for a consumer system, including:
- a power generator including at least one combustion turbine, the at least one combustion turbine including a compressor, a combustion chamber, a dynamic expansion turbine, and a component rotated by the dynamic expansion turbine, the power generator being configured to generate an electrical and/or mechanical power by compressing an incoming air flow entering the compressor to produce a compressed air flow, by heating, in the combustion chamber, the compressed air flow coming from the compressor, to form a flow feeding the turbine, and by expansion, in the dynamic expansion turbine, of the flow feeding the turbine to rotate the dynamic expansion turbine,
- the power generator being configured to generate, at predetermined defined site conditions, wherein said predetermined defined site conditions are site rated conditions determined during design of the power generator and determined prior to installation of the power generator, without any cooling or heating of the incoming air flow, a defined site electrical and/or mechanical power less than a predefined maximum required electrical and/or mechanical power to be supplied to the consumer system at the predetermined defined site conditions, by the power generator,
- an energy production system including a controller configured to control:
- a cooling of the incoming air flow when a power requested by the consumer system is greater than the defined site electrical and/or mechanical power of the power generator at the predetermined defined site conditions, based on a comparison of the power requested by the consumer system and a predefined site power, and is lower than or equal to the predefined maximum required electrical and/or mechanical power;
- a heating of the incoming air flow when the power requested by the consumer system is lower than the defined site electrical and/or mechanical power of the power generator at the predetermined defined site conditions, based on a comparison of the power requested by the consumer system and the predefined site power.

12. The energy production system according to claim 11, wherein the power generator includes multiple combustion turbines.

13. The energy production system according to claim 11, including a heat exchanger mounted upstream of the compressor to heat and/or cool the incoming air flow.

14. The energy production system according to claim 13, wherein the heat exchanger is configured to receive a heating stream produced from a flow coming from the combustion turbine or having received calories from a flow coming from the combustion turbine, to heat the incoming air flow.

15. The energy production system according to claim 11, including an absorption chiller, the heat exchanger being configured to receive a cooling stream coming from the absorption chiller.

16. The energy production system according to claim 15, wherein the absorption chiller is configured to produce the cooling stream from calories of a flow coming from the combustion turbine.

17. The system of claim 11, wherein the predetermined defined site conditions comprise at least one of:
- a maximum temperature encountered at the installation and/or an average temperature encountered at the installation, the temperatures being defined at a turbine inlet;
- a minimum atmospheric pressure encountered at the installation and/or a maximum atmospheric pressure encountered at the installation and/or a mean atmospheric pressure encountered at the installation, the pressures being defined at the turbine inlet and/or at a turbine outlet;

a maximum humidity encountered at the installation and/or an average humidity encountered at the installation, the humidities being defined at the turbine inlet.

* * * * *